United States Patent Office 3,228,889
Patented Jan. 11, 1966

3,228,889
CONVERSION CATALYST COMPRISING AN ALUMINOSILICATE PREPARED FROM A HYDROGEN ORGANOPEROXYMETALLOALUMINOSILICATE
William E. Garwood, Haddonfield, and George T. Kerr, Cherry Hill, N.J., assignors to Socony Mobil Oil Company, Inc., a corporation of New York
No Drawing. Filed Apr. 23, 1963, Ser. No. 274,925
17 Claims. (Cl. 252—428)

This invention relates to the catalytic conversion of hydrocarbons and in particular, to new and improved catalysts for use in certain hydrocarbon conversion processes.

It is known that both synthetic and naturally occurring aluminosilicates may be used as catalysts for the conversion of hydrocarbons. These aluminosilicates usually contain alkali metal or alkaline earth metal cations ionically bonded or chemisorbed within an ordered internal structure. In order to further enhance their catalytic activity, it has been found that these aluminosilicates may be base exchanged with certain metallic cations or with both metallic and hydrogen cations so as to replace the alkali metal or alkaline earth metal cations. These base exchange techniques may employ aqueous solutions of the salts of the metals to be base exchanged, organic or inorganic acids or other fluid media containing radicals convertible to the hydrogen ion. It will be appreciated that the catalytic activity produced by such base exchange methods is determined by the cations employed as well as the extent of base exchange within the aluminosilicate.

In accordance with this invention, the catalytic activity of these aluminosilicates, both those which have been base exchanged with metal cations or with metal and hydrogen cations as well as those which contain certain metal cations without base exchange, can be substantially modified and improved for the promotion of hydrocarbon conversion processes.

This invention contemplates new and improved aluminosilicate catalysts for the conversion of hydrocarbons by alkylation, isomerization, dehydrogenation, cracking, polymerization, and similar processes catalyzed by the presence of acidic catalyst sites. These catalysts are hydrogen organoperoxymetallolaluminosilicates and modifications thereof with an ordered internal structure having a defined pore size of at least 4 A. in diameter. Furthermore, this invention is directed to methods for preparing the aforementioned catalysts from naturally occurring and synthetic aluminosilicates which contain metal or both metal and hydrogen cation sites within an ordered internal structure; preferably, the cation sites are occupied by multivalent metal cations having a valence of two or greater.

Also, this invention is concerned with effecting conversion of hydrocarbons as described above in the presence of these improved hydrogenation organoperoxymetallo catalysts under certain reaction conditions.

In accordance with this invention, it has been found that the catalytic activity of a metal aluminosilicate for promoting hydrocarbon conversion reactions can be modified and substantially improved by formation of hydrogen organoperoxymetallo complexes at the metal cation sites within its ordered internal structure. These organoperoxymetallo complexes are produced by reacting the metal aluminosilicate with an organic hydroperoxide in a solvent medium at temperatures within the approximate range of 50 to 400° F. In addition, the catalytic activity of these aluminosilicates for conversion of hydrocarbons may be further modified by subsequent thermal treatment so as to remove all or a portion of the hydrogen organoperoxymetallo complexes formed within its ordered internal structure.

It will be appreciated that certain aluminosilicates, in particular, may be employed to produce the improved catalyst of this invention. Thus, it has been found that in order to produce hydrogen organoperoxymetallo complexes within the ordered internal structure of an aluminosilicate, the cation sites of the aluminosilicate should contain metals having a valence of two or more. Apparently, the higher valence metal cations react with organic hydroperoxides with a portion of their valence electrons so as to form a hydrogen organoperoxymetallo complex which is attached to the aluminosilicate by the other remaining valence electrons. Accordingly, it is believed that those metals having higher valences produce the improved catalysts with greater ease due to the excess of valence electrons available for formation of the organoperoxymetallo complexes. Consequently, the activity of the improved catalyst is determined not only by the concentration of metal cation sites within its ordered internal structure but also by the particular metals forming these cation sites. In addition, the availability of these organoperoxymetallo complexes for contact with the hydrocarbon reactants will determine the effective activity of the improved catalyst.

Advantageously, aluminosilicates having a high concentration of metallic cation sites suitable for the purpose of this invention may be prepared from several different naturally occurring or synthetic aluminosilicates. Generally, these aluminosilicates have exchangeable metal cations such as alkali metals and alkaline earth metals which may be completely or partially replaced by conventional base exchange with other metal cations or with both metal and hydrogen cations to produce the necessary concentration of metallic cation sites chemisorbed or ironically bonded within their ordered internal structure. It will be appreciated that the additional formation of acid sites produced by the hydrogen cations makes the aluminosilicate catalyst more active for certain conversion processes.

In general, the aluminosilicates can be exchanged with cations selected from Groups II, III and IV of the Periodic Table of Elements; the preferred metals being those having a valence of two or more, such as calcium, barium, cadmium, magnesium (Group II); cesium, lanthanum, natrium, praseodymium, gadolinium, yttrium (Group III); titanium, germanium, tin and lead (Group IV).

It will be understood that monovalent metal cations are not desirable for the purposes of this invention since their valence electrons would be taken by reaction with the hydroperoxide and therefore the organoperoxymetallo complex could not be firmly bonded to the aluminosilicate. It will also be appreciated that metal cations in other groups of the Periodic Tabel of Elements having multivalences may be base exchanged with the aluminosilicates to provide the metal aluminosilicates capable of being converted to the improved catalysts of this invention.

Because the unique activity of the aluminosilicate for effecting conversion of hydrocarbons is also determined by the availability of the active complex sites, the defined pore size of an aluminosilicate is to be considered when preparing the catalyst of this invention. Generally, the the aluminosilicate should have a pore size of about 4 A. or greater so that it may accept linear hydrocarbons within its ordered internal structure. It will be appreciated that those aluminosilicates having a pore size above 5 A. may also accommodate branched chain isomers of the aliphatic hydrocarbons as well as aromatic and alicyclic compounds. It will also be apreciated that the pore size desired for the improved aluminosilicate catalyst will depend upon the desired conversion process as well as the hydrocarbons to be treated.

Typical of the aluminosilicates employed in accordance with this invention, are several aluminosilicates, both natural and synthetic, which have a defined pore size of from 4 A. to 15 A. within an ordered internal structure. These aluminosilicates can be described as a three dimensional framework of $SiO_4$ and $AlO_4$ tetrahedra in which the tetrahedra are cross-linked by the sharing of oxygen atoms whereby the ratio of the total aluminum and silicon atoms to oxygen atoms is 1:2. In their hydrated form, the aluminosilicates may be represented by the formula:

$$M_{2/n}O:Al_2O_3:wSiO_2:yH_2O$$

wherein M is a cation which balances the electrovalence of the tetrahedra, $n$ represents the valence of the cation, $w$ the molds of $SiO_2$, and $y$ the moles of $H_2O$. The cation can be any or more of a number of metal ions depending on whether the aluminosilicate is synthesized or occurs naturally. Typical cations include sodium, lithium, potassium, calcium, and the like. Although the proportions of inorganic oxides in the silicates and their spatial arrangement may vary, effecting distinct properties in the aluminosilicates, the two main characteristics of these materials is the presence in their molecular structure of at least 0.5 equivalent of an ion of positive valence per gram atom of aluminum, and an ability to undergo dehydration without substantially affecting the $SiO_4$ and $AlO_4$ framework.

One of the crystalline aluminosilicates utilized by the present invention is the synthetic zeolite designated as zeolite X, and is represented in terms of mole ratios of oxides as follows:

$$1.0\pm0.2M_{2/n}O:Al_2O_3:2.5\pm0.5SiO_2:yH_2O$$

wherein M is a cation having a valence of not more than 3, $n$ represents the valence of M, and $y$ is a value up to 8, depending on the identity of M and the degree of hydration of the crystal. The sodium form may be represented in terms of mole ratios of oxides as follows:

$$0.9\pm.2Na_2O:Al_2O_3:2.5SiO_2:6.1H_2O$$

Zeolite X is commercially available in both the sodium and the calcium forms. It will be appreciated that the crystalline structure of zeolite X is different from many zeolites in that it can adsorb molecules with molecular diameters up to about 10 A.; such molecules including branched chain hydrocarbons, cyclic hydrocarbons, and some alkylated cyclic hydrocarbons.

Other aluminosilicates are contemplated as also being effective catalytic materials for the invention. Of these other aluminosilicates, a synthetic zeolite, having the same crystalline structure as zeolite X and designated as zeolite Y has been found to be active. Zeolite Y differs from zeolite X in that it contains more silica and less alumina. Consequently, due to its higher silica content this zeolite has more stability to the hydrogen ion than zeolite X.

Zeolite Y is represented in terms of mole ratios of oxides as follows:

$$0.9\pm0.2Na_2O:Al_2O_3:WSiO_2:XH_2O$$

wherein W is a value greater than 3 up to about 6 and X may be a value up to about 9.

The ability of zeolite Y to sorb larger molecules is approximately the same as zeolite X since its pore size extends from 10 A. to 13 A.

Another synthesized crystalline aluminosilicate designated as zeolite A has been found to be effective for the purposes of this invention. This zeolite can be represented in mole ratios of oxides as:

$$1.0\pm0.2M_{2/n}O:Al_2O_3:1.85\pm0.5SiO_2:yH_2O$$

wherein M represents a metal, $n$ is the valence of M and $y$ is any value up to about 6.

The prepared zeolite A may contain sodium ions and is so designated as zeolite "4A" when its pore size is about 4 A. Likewise, the calcium form of zeolite A, which has a pore size of about 5 A., is designated as zeolite "5A."

It will be appreciated that other aluminosilicates can be employed as catalysts for the conversion processes of this invention. A criterion for each catalyst is that the ordered internal structure must have defined pore sizes of sufficient diameters to allow entry of the preselected reactants and the formation of the desired reaction products. Furthermore, the aluminosilicate advantageously should have ordered internal structure capable of chemisorbing or ionically bonding additional metal and hydrogen ions as well as the subsequent formation of the hydrogen organoperoxymetallo complexes, within its pore structure so that its catalytic activity may be altered for a particular reaction. Among the naturally occurring crystalline aluminosilicates which can be employed are faujasite, heulandite, clinoptilolite, chabazite, gmelinite, mordenite and dachiardite.

One of the preferred aluminosilicates for the preparation of the improved catalyst of this invention is the calcium form of zeolite X, having a pore size of 10 A. This aluminosilicate is a commercially available synthetic zeolite designated as 10X. Another aluminosilicate which has been found to be effective for this invention is prepared from the sodium form of zeolite X, designated as 13X, as a result of base exchange involving partial or complete replacement of the sodium by contact with a fluid medium containing cations of at least one of the rare earth metals. Any medium which will afford ionization of the cations without affecting the crystalline structure of zeolite may be employed. After such base exchange treatment, the resulting exchanged zeolite product is water washed, dried, and dehydrated; dehydration thereby producing the characteristic system of open pores, passages, or cavities of the crystalline aluminosilicate.

After the aforementioned treatment, the rare earth exchanged aluminosilicate has a nuclear structure which has been altered by having rare earth metal cations chemically or ionically bonded thereto.

Advantageously, the rare earth cations can be provided from the salt of a single metal or preferably a mixture of metals such as rare earth chlorides or didymium chlorides. Such mixtures are usually introduced as a rare earth chloride solution which, as used herein, has reference to a mixture of rare earth chlorides consisting essentially of the chlorides of lanthanum, cerium, praseodymium, and neodymium, with minor amounts of samarium, gadolinium, and yttrium. This solution is commercially available and contains the chlorides of a rare earth mixture having the relative composition cerium (as $CeO_2$) 48% by weight, lanthanum (as $La_2O_3$) 24% by weight, praseodymium (as $Pr_6O_{11}$) 5% by weight, neodymium (as $Nd_2O_3$) 17% by weight, samarium (as $Sm_2O_3$) 3% by weight, gadolinium (as $Gd_2O_3$) 2% by weight, yttrium (as $Y_2O_3$) 0.2% by weight, and other rare earth oxides 0.8% by weight. Didymium chloride is also a mixture of rare earth chlorides, but having a low cerium content. It consists of the following rare earths determined as oxides: lanthanum, 45–46% by weight; cerium, 1–2% by weight; praesodymium, 9–10% by weight; neodymium, 32–33% by weight; samarium, 5–6% by weight; gadolinium, 3–4% by weight; yttrium, 0.4% by weight; other rare earths 1–2% by weight. It is to be understood that other mixtures of rare earths are equally applicable in the instant invention.

In addition, another active catalyst can be produced from sodium zeolite X by base exchange with both rare earth metals and by replacement of the sodium cations with hydrogen cations. The necessary base exchange may be accomplished by treatment with a fluid medium containing the rare earth metal and hydrogen or ammonium ions or alternatively by initial base exchange with rare earth metal cations followed by another containing hydrogen cations or cations capable of conversion to hydrogen cations. Inorganic and organic acids represent the source of hydrogen cations, whereas ammonium compounds are representative of the compounds containing cations capable of conversion to hydrogen cations. In will be appreciated that this fluid medium may contain a hydrogen cation, an ammonium cation, or mixture thereof, and a pH range from about 1 to about 12.

Other effective aluminosilicates for the present conversion catalyst can be prepared from synthetic aluminosilicates such as zeolite Y and zeolite A. Zeolite Y, like zeolite X, may be exchanged to contain rare earth metals for the sodium ions within zeolite Y or exchanged with other multivalent metals so as to produce metal cation sites capable of forming the organoperoxymetallo complexes contemplated by this invention.

It will be appreciated that although naturally occurring aluminosilicates may be employed for the purposes of this invention, the preferred aluminosilicates are those synthetic zeolites which have, or are prepared so as to have, a divalent or other multivalent cations within an ordered internal structure.

The method for preparing the hydrogen organoperoxymetalloaluminosilicate catalyst of this invention, is general consists of reacting an aluminosilicate having multivalent metal cations ionically or chemisorbed within its ordered internal structure with an organic hydroperoxide dissolved in a suitable solvent medium. A primary consideration for controlling the reaction is that the stoichiometric relationship between the hydroperoxide and the amount of cation bound to the aluminosilicate should always be such that the cation will have some valence bonds satisfied by the aluminosilicate. For example, the mole ratio of the organic hydroperoxide to divalent metal cations should be less than two, while that to a trivalent cation should be less than three.

It will be appreciated that the concentration of metal cations within the aluminosilicate is not critical and that the total moles of the metal per gram of the metalloaluminosilicate may extend from about 0.006 to about 0.0006. In addition, the molar ratio between the organic hydroperoxide and the metal cations within the aluminosilicate may be varied from about 0.5:1 to less than that of the valence of the metal cation, i.e. less than 2:1 for a divalent cation and less than 3:1 for a trivalent cation, in order to form the improved catalyst.

The process may be operated at about atmospheric pressure or superatmospheric pressure; usually, the pressure is autogenous. As to temperature, the reaction may take place at a temperature range from 50° to 400° F. Generally, the reaction is initiated at room temperature. In addition, because the reaction is usually highly exothermic, the time of reaction, as well as its completion, may be determined by the resulting rapid rise from and subsequent gradual return of the reaction medium to room temperature. That is to say, once the temperature of the reaction medium has subsided to the initial room temperature, the reaction is substantially complete. Preferably, reactants are also agitated during the reaction to promote more uniform heat transfer through the reaction medium as well as to produce a uniform reaction product.

The resulting slurry of catalyst material may be separated from the solvent and excess organic hydroperoxide by conventional techniques such as centrifugal separation, distillation, and the like.

In addition, the organoperoxymetalloaluminosilicate catalyst can be modified to produce other effective catalyst materials for promoting hydrocarbon conversion reaction. Thus, it has been found that heating of the prepared catalyst material to relatively high temperatures causes partial dissociation of the hydrogen organoperoxymetallo complexes formed therein. By such dissociation, formation of an organometalloaluminosilicate with a loss of oxygen may be obtained from the prepared catalyst material. The organometalloaluminosilicate is particularly effective for promoting conversion of organic compounds, catalytically convertible in the presence of acidic catalyst sites, such as alkylation, polymerization, cracking and the like. Also, it has been found that the prepared catalyst may be further modified by calcining the material in an atmosphere containing free oxygen at a temperature sufficient to remove substantially all of the organic material from its ordered internal structure. Heating in air, for example, at about 1000° F. accomplishes such result. The resulting metalloaluminosilicate has been found to have an ordered internal structure substantially different than that of the original aluminosilicate utilized to prepare the improved catalyst. It is believed that the hydrogen ion content of the catalyst material has been increased by the hydrogen cation of the peroxy group being attached to the aluminosilicate framework as required to maintain electrical neutrality. Irrespective of the mechanism of the rearrangement, this modified metalloaluminosilicate catalyst has been found to be effective for promoting a wide variety of conversion reactions as alkylation, polymerization, and like processes.

It will be appreciated that the organoperoxymetalloaluminosilicate catalyst or modifications thereof, may be further subjected to additional base exchange treatment with acidic compounds or the like to convert the organoperoxy portion of the complex moiety to alkoxide or alkyl containing aluminosilicates and thereby provide catalyst materials having specific activity for reaction systems such as olefin polymerization, n-hexane isomerization, alkylation of benzenes, and similar processes.

In accordance with this invention, several organic hydroperoxides may be employed to form the organoperoxymetallo complexes at the cation sites within the improved aluminosilicate catalyst. In general, these organic hydroperoxides may be represented by the following formula:

$$ROOH$$

where R is a monovalent organic radical, e.g. alkyl, cycloalkyl, alkylene, cycloalkylene, alkylaryl, aryl, and the like groups. Moreover, the alkyl group may include primary, secondary and tertiary alkyls. In general, R contains from 1 to 20 carbon atoms; preferably, it contains from 3 to 15 carbon atoms. Exemplary of the organic hydroperoxides suitable for this invention are n-butyl hydroperoxide, sec-butyl hydroperoxide, t-butyl hydroperoxide, cumene hydroperoxide, triphenyl methyl hydroperoxide, and the like.

It will be appreciated that since the organic hydroperoxides are generally employed in a liquid solvent medium, the lower molecular weight hydroperoxides such as methyl hydroperoxide, ethyl hydroperoxide and propyl hydroperoxide which are extremely volatile and difficult to handle in their natural state, may also be employed for the purposes of this invention. It will also be appreciated that the above described aryl groups will include hydrocarbon derivatives of the benzene, anthracene and naphthalene series.

The hydrocarbons which may be reacted in the presence of the improved catalyst by alkylation, isomerization, cracking, polymerization, dehydrogenation, and the like processes include linear and branched chain aliphatic hydrocarbons, both saturated and unsaturated, alicyclic hydrocarbons, aromatic hydrocarbons and homologs thereof. Exemplary of these hydrocarbons are n-hexanes, olefins, benzenes, naphthalenes, and the like hydrocarbons. It will be appreciated that these hydrocarbons may contain various substituent groups; the particular substituent group depending upon the reaction or process to which the hydrocarbon is to be subjected. Thus, in the alkylation of aromatic hydrocarbons, the hydrocarbon to be alkylated may contain alkyl, cycloalkyl, aryl or the like substituents. Moreover, olefinic hydrocarbons that can be polymerized include both mono- and diolefin type compounds. In general, these hydrocarbons may contain from 1 to 20 carbon atoms per molecule.

Several organic solvents may be employed to dissolve the organic hydroperoxides and function as the liquid reaction medium for preparing the catalysts of this invention. The solvent insures complete wetting of the aluminosilicate and affords even distribution of the organic hydroperoxide over the catalyst surface. Typical organic solvents include those comprising aliphatic hydrocarbons, typified by liquid paraffinic hydrocarbons such as hexanes, heptanes and the like. A particularly effective solvent is petroleum ether, a mixture of pentanes and hexanes.

The aluminosilicate catalyst may be employed directly as a catalyst or it may be combined with a suitable support or binder. The particular chemical composition of the latter is not critical. It is, however, necessary that the support or binder employed be thermally stable under the conditions at which the conversion reaction is carried out. Thus, it is contemplated that solid porous adsorbents, carriers and supports of the type heretofore employed in catalytic operations may feasibly be used in combination with the crystalline aluminosilicate. Such materials may be catalytically inert or may possess an intrinsic catalytic ativity or an activity attributable to close association or reaction with the crystalline aluminosilicate. Such materials include by way of examples, dried inorganic oxide gels and gelatinous precipitates af alumina, silica, zirconia, magnesia, thoria, titania, boria and combinations of these oxides with one another and with other components. Other suitable supports include activated charcoal, mullite, kieselguhr, bauxite, silicon carbide, sintered alumina and various clays. These supported crystalline aluminosilicates may feasibly be prepared as described in copending application of Albert B. Schwartz, Serial No. 147,722 filed October 26, 1961, now abandoned, by growing crystals of the aluminosilicate in the pores of the support. Also, the aluminosilicate may be intimately composited with a suitable binder, such as inorganic oxide hydrogel or clay, for example by ball milling the two materials together over an extended period of time, preferably in the presence of water, under conditions to reduce the particle size of the aluminosilicate to a weight mean particle diameter of less than 40 microns and preferably less than 15 microns. Also, the aluminosilicate may be combined with and distributed throughout a gel matrix by dispersing the aluminosilicate in powdered form in an inorganic oxide hydrosol. In accordance with this procedure, the finely divided aluminosilicate may be dispersed in an already prepared hydrosol or, as is preferable, where the hydrosol is characterized by a short time of gelation, the finely divided aluminosilicate may be added to one or more of the reactants used in forming the hydrosol or may be admixed in the form of a separate stream with streams of the hydrosol-forming reactants in a mixing nozzle or other means where the reactants are brought into intimate contact. The powder-containing inorganic oxide hydrosol sets to a hydrogel after lapse of a suitable period of time and the resulting hydrogel may thereafter, if desired, be exchanged to introduce selected ions into the aluminosilicate and then dried and calcined.

The inorganic oxide gel employed, as described above as a matrix for the metal aluminosilicate, may be a gel of any hydrous inorganic oxide, such as, for example, aluminous or siliceous gels. While alumina gel or silica gel may be utilized as a suitable matrix, it is preferred that the inorganic oxide gel employed be a cogel or silica and an oxide of at least one metal selected from the group consisting of metals of Groups IIA, IIIB, and IVA of the Periodic Table. Such components include for example, silica-alumina, silica-magnesia, silica-zirconia, silica-thoria, silica-beryllia, silica-titania as well as ternary combinations such as silica-alumina-thoria, silica-alumina-zirconia, silica-alumina-magnesia and silica-magnesia-zirconia. In the foregoing gels, silica is generally present as the major component and the other oxides of metals are present in minor proportion. Thus, the silica content of such gels is generally within the approximate range of 55 to 100 weight percent with the metal oxide content ranging from zero to 45 weight percent. The inorganic oxide hydrogels utilized herein and hydrogels obtained therefrom may be prepared by any method well-known in the art, such as for example, hydrolysis of ethyl orthosilicate, acidification of an alkali metal silicate and a salt of a metal, the oxide of which it is desired to cogel with silica, etc. The relative proportions of finely divided crystalline aluminosilicate and inorganic oxide gel matrix may vary widely with the crystalline aluminosilicate content ranging from about 2 to about 90 percent by weight and more usually, particularly where the composite is prepared in the form of beads, in the range of about 5 to about 50 percent by weight of the composite.

The catalyst of aluminosilicate employed in the process of this invention may be used in the form of small fragments of a size best suited for operation under the specific conditions existing. Thus, the catalyst may be in the form of a finely divided powder or may be in the form of pellets of $\frac{1}{16}''$ to $\frac{1}{8}''$ size, for example, obtained upon pelleting the aluminosilicate with a suitable binder such as clay. The zeolite X, described hereinabove, may be obtained on a clay-free base or in the form of pellets in which clay is present as a binder.

It will be appreciated that the operating procedures and conditions employed in the present invention for the preparation of the improved hydrogen organoperoxy-metalloaluminosilicate catalyst are dependent on the specific metalloaluminosilicates being treated, the hydroperoxide reactant, and the solvent used for the reaction medium. Such conditions as temperature, molar ratio of reactants and time of reaction will have substantial effects on the resulting catalyst material. The manner in which these conditions affect preparation of the catalyst of this invention may be more readily understood from the following specific examples.

In the following examples, several different metal aluminosilicates were reacted with tertiary-butyl hydroperoxide to form the hydrogen organoperoxymetalloaluminosilicate catalysts contemplated by this invention. One of these metalloaluminosilicates was calcium zeolite X (a molecular sieve material commonly designated as 10X). This aluminosilicate contained 11.2 weight percent of calcium or a total of about 0.003 mole/gram.

Another metal aluminosilicate used was a rare earth exchanged zeolite X. This exchanged zeolite was made by base exchanging sodium zeolite X with an aqueous solution of rare earth chlorides so as to contain 27.4 weight percent of the rare earth metals or a total of about 0.0017 mole/gram. After such base exchange treatment this aluminosilicate was washed free of chloride anions, dried and calcined in a conventional manner to provide the characteristic defined pore structure of the crystalline aluminosilicate.

Another base exchanged synthetic aluminosilicate utilized was prepared by exchanging sodium X with a solution of rare earth chlorides and ammonium chloride, to produce a rare earth-acid exchanged zeolite X. It will be understood that the ammonium radical $(NH_4)^+$ is convertible to the hydrogen ion by the subsequent application of heat which causes ammonia $(NH_3)$ to be driven off from the treated aluminosilicate. After washing, drying, and calcinating this aluminosilicate was found to contain 22.6 weight percent of the rare earth metals or a total of about 0.0014 mole/gram.

In order to determine the effect of an organic hydroperoxide on an acid exchanged aluminosilicate, acid zeolite Y was prepared by base exchanging zeolite Y with ethylenediamminetetraacetic acid followed by treatment with a solution of ammonium chloride. Conventional washing and drying produced a solid particulate, highly acid, aluminosilicate material.

In each of the following examples the aluminosilicate material was placed in a 500 cc. glass flask equipped with a stirrer and thermometer in either powdered or particulate form. Then, t-butyl hydroperoxide, dissolved in petroleum ether, was poured into the flask and intimately mixed with the aluminosilicate by stirring. After such mixing there was a noticeable rise in temperature in all cases where reaction occurred as well as a subsequent change in color of the aluminosilicate material. After the temperature of the reaction medium had substantially returned to its original initial temperature, the resulting slurry was distilled under reduced pressure to separate the ether and the excess hydroperoxide from the reaction product. Analysis of the product show a substantial content of carbon, hydrogen, and organic oxygen (oxygen bound to carbon).

Another effect of the formation of the hydrogen organoperoxymetallo complexes within the aluminosilicates, was evidenced by its adsorption for cyclohexane. A portion of the catalyst was heated in an air stream to 1200° F. to oxidize off all of the organic material. Then this calcined portion was contacted with cyclohexane to determine the extent of cyclohexane adsorption. A comparison of the amount of cyclohexane adsorbed prior and subsequent to the reaction showed that less cyclohexane was adsorbed after formation of the hydrogen organoperoxymetallo complexes within the aluminosilicate, indicating a rearrangement or other modification of the metal cation sites within the aluminosilicate.

EXAMPLE 1

98.5 grams of calcium zeolite X powder (containing 0.28 mole of Ca) were added to a 500 cc. round bottom flask equipped with stirrer, water condenser, and thermometer. Then, a solution of 28 grams (0.31 mole) of t-butyl hydroperoxide, in 93 ml. of petroleum ether was added to the flask. The temperature of the resulting slurry increased from 85° F. to 103° F. in about 5 minutes, and then dropped off to 90° F. in the following 40 minutes. After a total of 2 hours, the temperature of the slurry had returned to 85° F. Then, the stirrer was turned off and the slurry was topped at a reduced pressure; the maximum temperature being 111° F. at 1.8 mm. of Hg to remove the excess t-butyl hydroperoxide and petroleum ether. The separation produced a tan-colored product weighing 115.3 grams and analyzing as follows:

| | Weight percent |
|---|---|
| Carbon | 4.3 |
| Hydogen | 0.49 |
| Organic oxygen | 2.88 |

A portion of this hydrogen organoperoxymetallo-aluminosilicate product was heated in a stream of air to a temperature of 1020° F. and held at this temperature for 16 hours so as to oxidize and remove all organic material. 1.0 gram of this product was then evacuated under 1 mm. Hg and treated with cyclohexane vapors until the pressure was constant at 20 mm. Hg, catalyst weight 1.122 grams. The resulting product was found to adsorb 10.9 weight percent of cyclohexane compared to 12.7 weight percent adsorbed by the original calcium zeolite X.

It will be apparent, as shown by the above analysis and adsorption data, that the cation sites within the ordered internal structure of the calcim zeolite X were substantially modified by the formation of the hydrogen organoperoxymetallo complexes.

*Example II*

Another portion of the calcium zeolite X employed in Example I was treated in the same manner except that petroleum ether alone was used. The final calcined catalyst was found to adsorb 12.7 weight percent of cyclohexane. This adsorption was identical to that of the starting calcium zeolite X; thus showing that no reaction occurred by simple treatment with the hydrocarbons found in the petroleum ether.

*Example III*

25 grams of a rare earth exchanged zeolite X powder containing 0.042 moles of the rare earth metals were mixed with a solution of 7 grams (.08 mole) of t-butyl hydroperoxide in 22 ml. of petroleum ether as described in Example I above. A vigorous reaction took place causing the temperature to rise from 82° F. to more than 166° F. After 15 minutes the temperature of the reaction subsided to 122° F. and within one hour the temperature was back to 82° F. Distillation of the excess reactants and solvents from the resulting product was performed under reduced pressure at a maximum temperature of 118° F. and 2 mm. of Hg. The brown-colored product gave the following analysis:

| | Weight percent |
|---|---|
| Carbon | 6.86 |
| Hydrogen | 0.79 |
| Organic oxygen | 5.96 |

A portion of this product was calcined as in Example I and then treated with cyclohexane. The catalyst was found to adsorb 15.4 weight percent of cyclohexane as compared to 15.6 weight percent of that of the original rare earth exchanged zeolite X.

It will be appreciated that the molar ratio between the hydroperoxide and the rare earth metal present within the aluminosilicate was considerably higher (2:1 as compared to 1.1:1) in this reaction than that of Example I. Apparently, adsorption characteristics of the aluminosilicate do not reflect this change as much as the organic weight analysis which was also appreciably higher.

*Example IV*

2.5 grams of the rare earth exchanged acid zeolite X containing a total of 0.0035 mole of rare earth metals were added to a solution of 0.7 grams (0.008 mole) of t-butyl hydroperoxide dissolved in 2.2 ml. of petroleum ether. The reaction was vigorous as evidenced by a temperature rise from 82°F. to a maximum of 156° F. in 3 minutes. Then, the temperature subsided to 104° F. during the next 7 minutes. Thus, this reaction was not as vigorous as that of the previous example with the rare earth exchanged zeolite.

This less vigorous reaction is in line with the reduced amount of rare earth metals together with the higher concentration of hydrogen found within the aluminosilicate.

From the above examples, it will be apparent that the extent to which the hydrogen organoperoxymetallo complexes are formed is determined by the concentration of metal cations found within the aluminosilicate, as well as the valence state of the metal. Comparison of the composition analysis run in Examples I and II shows that the higher valence rare earth metal reacted more vigorously with the t-butyl hydroperoxide than the divalent calcium.

It will be appreciated that the examples set forth above as well as the foregoing specification, are merely illustrative of the different aluminosilicates which may be reacted with organic hydroperoxides to form the improved catalyst of the present invention and that other aluminosilicates and organic peroxides may be used in accordance with this invention.

It will also be appreciated that subsequent base exchange techniques may be employed with the improved catalyst so as to further modify their catalytic activity and that various modifications and alterations may be made in the improved catalyst and its method of preparation without departing from the spirit of the invention.

What is claimed is:

1. A catalytic composition comprising an aluminosilicate material prepared from a hydrogen organoperoxymetalloaluminosilicate, said aluminosilicate material having a defined pore size of at least 4 A. in diameter within an ordered internal structure.

2. The catalyst of claim 1 in which the hydrogen organoperoxymetalloaluminosilicate is a metalloaluminosilicate having hydrogen organoperoxymetallo complexes bonded at the cation sites within its ordered internal structure.

3. The catalyst of claim 1 in which the hydrogen organoperoxymetalloaluminosilicate is the reaction product of an organic hydroperoxide having the general formula ROOH, where R is an organic substituent selected from the group consisting of alkyl, cycloalkyl, alkylene, cycloalkylene, alkylaryl, and aryl radicals and a metal aluminosilicate having metallic cation sites within its ordered internal structure.

4. The catalyst of claim 1 in which said aluminosilicate material has organometallo complexes bonded at the cation sites within its ordered internal structure.

5. The catalyst of claim 1 in which said aluminosilicate material is a metalloaluminosilicate produced by heating said hydrogen organoperoxymetalloaluminosilicate to a temperature sufficient to oxidize and remove substantially all organic material from its ordered internal structure.

6. The catalyst of claim 1 in which said aluminosilicate material is contained in an matrix binder material.

7. An improved catalytic composition comprising the hydrogen organoperoxymetalloaluminosilicate produced by reaction of a crystalline metal aluminosilicate, the metal cation of which has a valence of at least two and an organic hydroperoxide.

8. An improved catalytic composition comprising the hydrogen organoperoxymetalloaluminosilicate produced by reaction of calcium zeolite X and t-butyl hydroperoxide.

9. The catalyst of claim 8 in which the molar ratio between the t-butyl hydroperoxide and the calucium cations present in the calcium zeolite is less than 2:1.

10. An improved catalytic composition comprising the organoperoxymetalloaluminosilicate produced by reacting a rare earth exchanged zeolite X with t-butyl hydroperoxide, the molar ratio of hydroperoxide to the rare earth metals within said zeolite X being less than the valence of said rare earth metals.

11. An improved catalytic composition comprising the hydrogen organoperoxymetalloaluminosilicate produced by reacting a rare earth-acid exchanged zeolite X with t-butyl hydroperoxide, the molar ratio between the hydroperoxide and the rare earth metals within the zeolite X being less than the valence of the rare earth metals.

12. A method of catalyst preparation which comprises effecting reaction of an organic hydroperoxide and an aluminosilicate having metallic cations within an ordered internal structure in the presence of a liquid reaction medium; said cations having a valence of at least 2.

13. The method of claim 12 in which the organic hydroperoxide may be represented by the general formula ROOH in which R is an organic substituent selected from the group consisting of alkyl, cycloalkyl, alkylene, cycloalkylene, alkylaryl, and aryl radicals.

14. The method of claim 12 in which the aluminosilicate has a defined pore size of from about 4 A. to about 15 A. in diameter.

15. The method of claim 12 in which the reaction is effected at a temperature in the approximate range of 50 to 400° F.

16. A method of modifying the catalytic activity of a hydrogen organoperoxymetalloaluminosilicate having an ordered internal structure which comprises heating the aluminosilicate to sufficient temperature to cause loss of oxygen and the formation of an organometalloaluminosilicate from said aluminosilicate.

17. The ethod of modifying the catalytic activity of a hydrogen organoperoxymetalloaluminosilicate catalyst which comprises heating said catalyst to a sufficiently elevated temperature and for a sufficient time to remove substantially all of its organic material and form a metalloaluminosilicate, the ordered internal structure of which differs from that of the metalloaluminosilicate employed to prepare said aluminosilicate.

References Cited by the Examiner

UNITED STATES PATENTS

| | | | |
|---|---|---|---|
| 2,895,919 | 7/1959 | Gerhart | 252—430 |
| 2,971,903 | 2/1961 | Kimberlin et al. | 208—119 |
| 2,971,904 | 2/1961 | Gladrow et al. | 208—120 |
| 3,039,953 | 6/1962 | Eng | 208—120 |
| 3,140,249 | 7/1964 | Plank et al. | 208—120 |

DELBERT E. GANTZ, *Primary Examiner.*

ALPHONSO D. SULLIVAN, *Examiner.*

UNITED STATES PATENT OFFICE
CERTIFICATE OF CORRECTION

Patent No. 3,228,889                                      January 11, 1966

William E. Garwood et al.

It is hereby certified that error appears in the above numbered patent requiring correction and that the said Letters Patent should read as corrected below.

Column 2, line 52, for "Tabel" read -- Table --; line 68, for "apreciated" read -- appreciated --; column 3, line 15, for "molds" read -- moles --; column 8, line 22, for "base" read -- basis --; column 9, line 17, for "1200° F." read -- 1020° F. --; column 11, line 29, for "calucium" read -- calcium --; column 12, line 23, for "ethod" read -- method --.

Signed and sealed this 6th day of December 1966.

(SEAL)
Attest:

ERNEST W. SWIDER                                  EDWARD J. BRENNER
Attesting Officer                                           Commissioner of Patents